United States Patent [19]

Peddinghaus et al.

[11] 4,067,252
[45] Jan. 10, 1978

[54] MACHINE TOOL WITH CYLINDRICAL ASSEMBLY UNITS

[75] Inventors: Rolf Peddinghaus; Ludwig Regenbrecht, both of Gevelsberg, Germany

[73] Assignee: Rolf Peddinghaus, Gevelsberg, Germany

[21] Appl. No.: 692,558

[22] Filed: June 3, 1976

[30] Foreign Application Priority Data

June 6, 1975 Germany ............................ 2525391

[51] Int. Cl.² .......................... B26D 5/04; B26D 5/12
[52] U.S. Cl. ................................. 83/571; 72/453.01; 83/639; 100/214
[58] Field of Search ................... 408/234; 83/571, 639; 72/453.01, 453.18; 100/214

[56] References Cited

U.S. PATENT DOCUMENTS

| | | | |
|---|---|---|---|
| 3,255,655 | 6/1966 | Stockard, Jr. | 83/639 X |
| 3,529,502 | 9/1970 | Krynytzky et al. | 83/639 X |
| 3,704,644 | 12/1972 | Cloup | 83/639 |

Primary Examiner—Z. R. Bilinsky
Attorney, Agent, or Firm—Dressler, Goldsmith, Clement, Gordon & Shore, Ltd.

[57] ABSTRACT

The invention comprises an improved machine tool assemblage incorporating a machine stand in which there are provided cylindrical assembly units located in bores disposed transversely to the working direction of the machine functions to be performed. The cylindrical assembly units contain working cylinders and pistons for operating tool slide mechanisms for performing the requisite functions on workpieces positioned on the machine stand.

8 Claims, 4 Drawing Figures

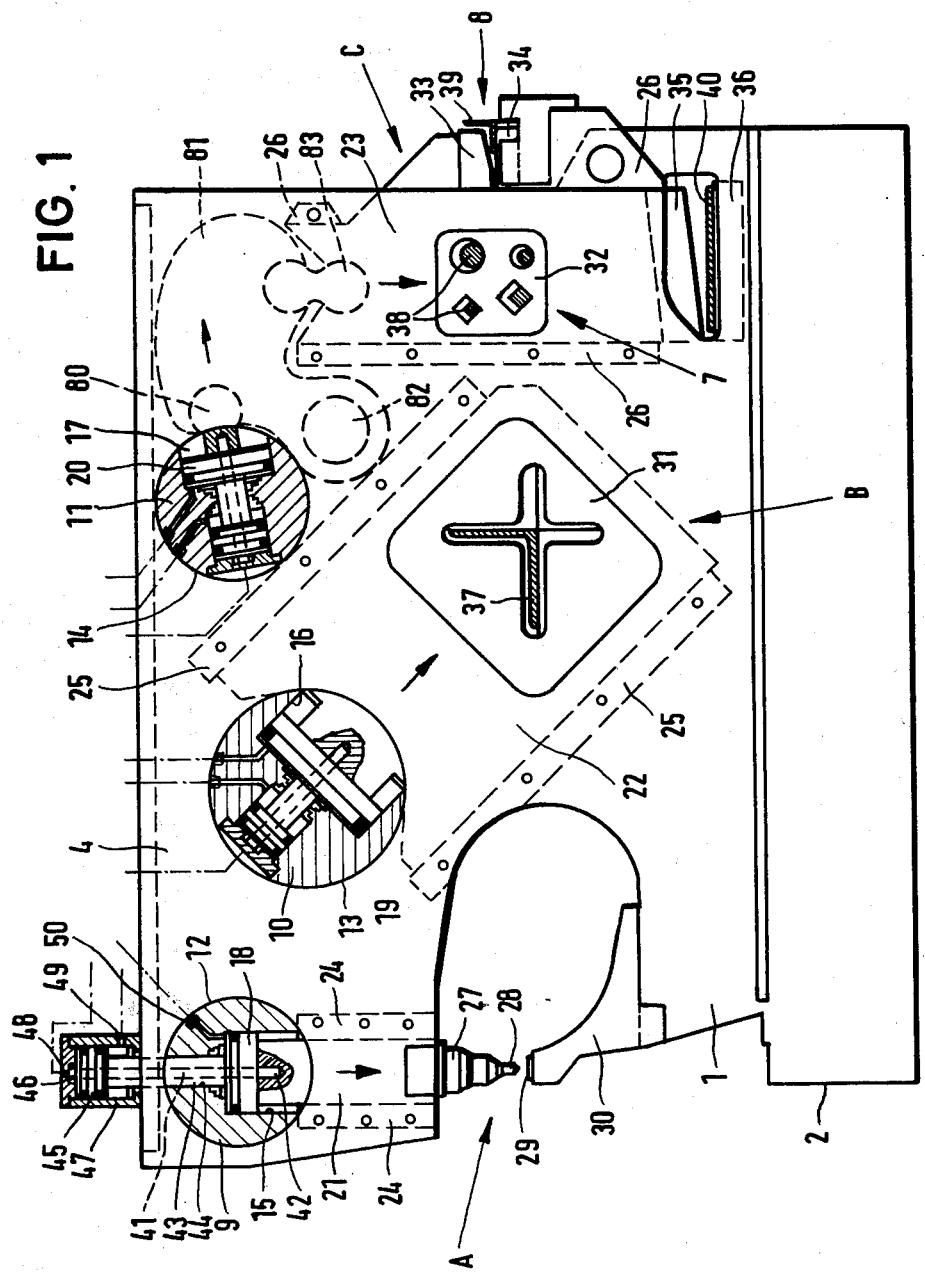

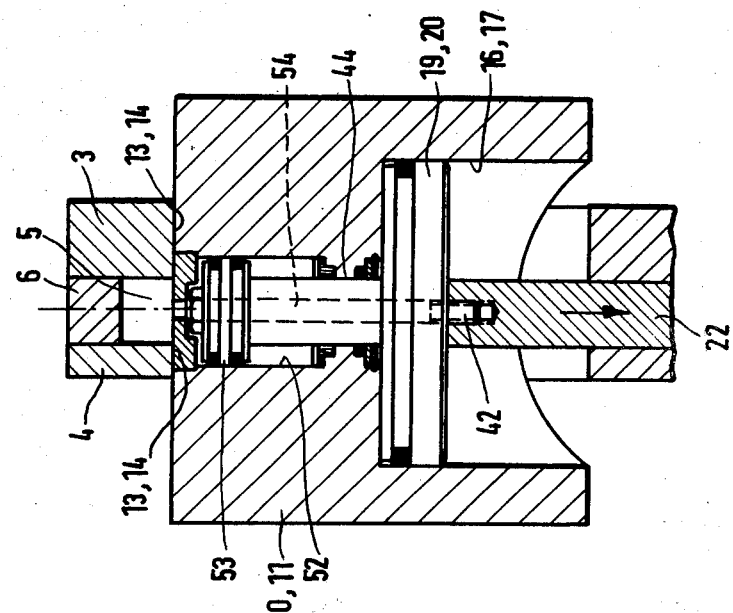
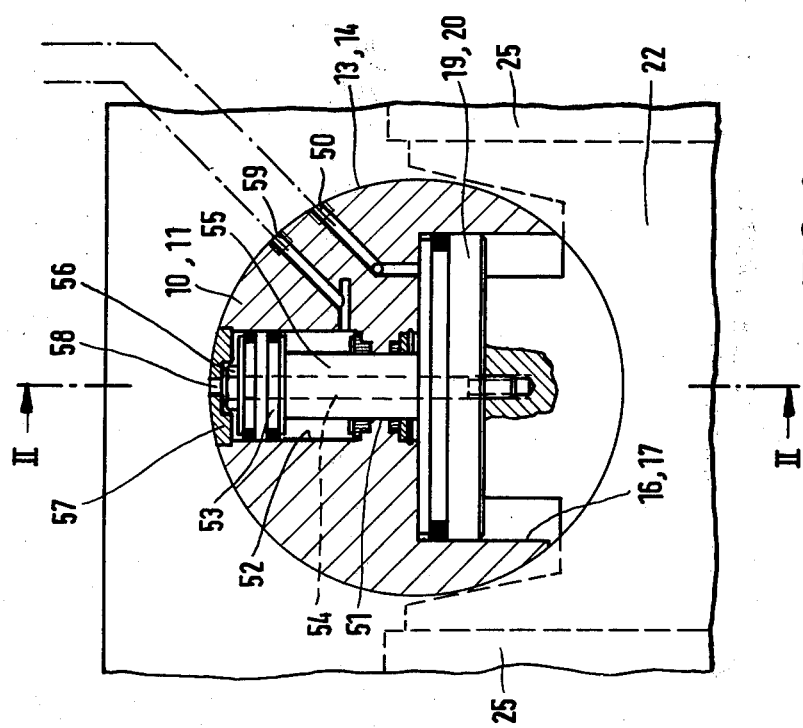
FIG. 2b
FIG. 2a

MACHINE TOOL WITH CYLINDRICAL ASSEMBLY UNITS

The invention relates to a machine tool, in particular, a combined profiled bar cutter and punch press, wherein a tool slide, which is longitudinally displaceable in the machine stand, is arranged to be moved toward a workpiece holder by means of the piston rod of a working cylinder, which is actuated by a pressurized medium and is mounted in the machine stand.

In the case of machine tools of the above-mentioned known kind, the cover plate end of the hydraulic working cylinder is often provided with pins which are mounted to pivot in holes formed in two oppositely disposed walls of a machine stand, whereas the piston of the working cylinder is linked in a suitable manner with a tool slide which is longitudinally displaceable in the machine stand and can execute a reciprocatory working movement with the aid of the piston rod of the hydraulic cylinder.

The fitting and removal, i.e., the exchange of such working cylinder units, is generally a troublesome manner and therefore time-consuming. Furthermore, such working cylinder units require a relatively large space.

A machine tool has, therefore, been disclosed wherein a working cylinder is provided with a flange which is inserted in rectangular gaps cut in a machine stand which is open at the top. The formation of such rectangular gaps in a machine stand is again very costly, and the columns forming the machine stand are reduced in strength by the presence of the rectangular recesses, in their force-absorbing cross section, i.e., in a zone where the material of the columns is in any case subjected to considerable load on account of the reaction forces transmitted to them. Thus, undesirable shear loads occur both in the zone where the flange joins the working cylinder and in the corners of the rectangular cut-out portions in the columns of the machine stand (prospectus on Fabriline Anglemaster, published by Manco Manufacturing Company, Bradley, Illinois, U.S.A.).

In another known machine tool, the piston-and-cylinder unit is fitted in a slide which is designed as a solid frame. Although this arrangement results in the reaction forces, that occur when the unit is operated, being absorbed in a better manner, the frame is very costly to produce, since a large rectangular portion must be cut away to accommodate the piston-and-cylinder unit.

The object of the present invention is to design a machine tool of the initially stated kind in such a way that, while the machine can be produced at low cost, very high reaction forces can be transmitted to the machine stand, while at the same time narrow tolerance ranges for the required workpiece dimensions are maintained, and assembly and dismantling can still be readily carried out.

According to the present invention, this object is achieved in that the working cylinder is contained in a substantially cylindrical assembly unit which can be inserted in at least one bore formed in the machine stand, which bore extends transversely to the working direction of the working cylinder.

This arrangement results in an extremely low cost for the provision of means for holding one or more working cylinders, since it is only necessary to provide one or more bores to enable the working cylinder to be fitted into the machine. The area for the transmission of shear forces from the circumferential surface of the assembly unit to the wall of the bore in the machine stand is very great, so that overloading of individual elements or local zones does not occur; thus, no appreciable elastic or permanent deformation occurs even when very high forces, for example, up to 300 Mp, are used, so that tolerances on the dimensions of the workpieces can be kept very close. The invention offers very special advantages in the case of combined machine tools, i.e., machines which are able to carry out, simultaneously, a fairly large number of working functions which may be indpendent of each other, such as is the case, for example, in a combined profiled bar cutter and punch press. If the working directions of the various working cylinders required for carrying out these functions are in the same plane or in parallel planes, then, using a fixed boring plan and with the aid of a multiple boring machine, all the bores for accommodating such assembly units containing the working cylinders can be formed simultaneously, so that the assembly unit can be immediately fitted into the bores thereafter.

In this connection, it is particularly advantageous for the cylindrical assembly units to have a push-fit in the bores in the machine stand. This push-fit can be achieved in a simple manner in one operation by suitably selecting the diameter of the boring tools to match the outside diameters of the cylindrical assembly units.

In order to divert the reaction forces, applied when the working cylinder is operating, into the machine stand, it is desirable to mount the cylindrical assembly unit in oppositely disposed spaced members of the machine stand. Moreover, this push-fit enables the assembly unit to move freely about its longitudinal axis in the machine stand, so that certain amounts of torque that may be applied to the assembly unit when the working cylinder is operating in it can be offset without difficulty. A considerable advantage of this arrangement resides in the fact that the distance between the members, i.e., walls of the machine stand, can be kept smaller than the diameter of the piston in the working cylinder.

Expediently, the working cylinder in the cylindrical assembly unit can be provided for forming it as a cylindrical blind-end bore in the cylindrical assembly unit, which bore extends radially of the main axis of the assembly unit. Consequently, the working cylinder simply has to be inserted into this cylindrical bore, and this renders the fitting of the assembly unit itself extremely simple. In this connection, considerable advantage accrues if that end-face of the working cylinder that is remote from the working piston and can also be regarded as the cylinder coverplate lies in a diametral plane of the cylindrical assembly unit. This offers the advantage that, because of the cylindrical form of the assembly unit, the greatest load due to the hydraulic pressure occurs in the zone of the greatest cross section of the assembly unit, so that the statically most favorable form of the assembly unit and the working cylinder accommodated therein is obtained.

To enable a rapaid forward stroke and/or a rapid return stroke of the working piston to be carried out in the shortest possible time within the assembly unit, optionally in combination with an exploratory operation for center-punching, or for straightening the tool prior to the actual working movement, it is preferred, in accordance with a further feature of this invention, to fit a rapid-stroke cylinder and/or its piston rod at least partially in the cylindrical assembly unit and coaxially with the working cylinder, the piston of the rapid-stroke cylinder being connected, in a mechanically positive manner, to the piston of the working cylinder which is of greater diameter than the piston of the rapid-stroke cylinder, which latter piston can be acted upon by the pressurized medium at least in the direction of the workpiece. holder. In this arrangement, the rapid-stroke cylinder can likewise be formed by a cylindrical blind-end bore formed in the cylindrical assembly unit. However, a casing for the rapid-stroke cylinder in which the rapid-stroke piston is guided can also be fitted in a blind-end bore formed in the cylindrical assembly unit. Furthermore, the rapid-stroke cylinder may also be disposed on the machine stand at a distance from the cylindrical assembly unit.

Embodiments of the invention are illustrated in the annexed drawings, in which:

FIG. 1 is a side view, partly in section, of a combined profiled bar cutter and punch press with three cylindrical assembly units each accommodating a working cylinder;

FIG. 2a shows one of the FIG. 1 assembly units with its working cylinder and a cylinder having a rapid forward and return stroke;

FIG. 2b is a section on the line II—II of FIG. 2a; and

Figure 3:
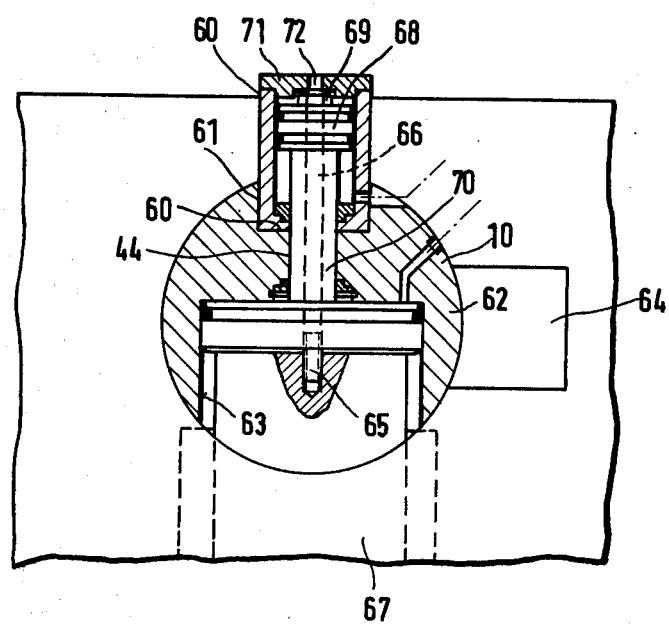
FIG. 3 illustrates a further form of construction of a cylindrical assembly unit with a working cylinder and a cylinder having a rapid forward and return stroke.

Provided in the machine tool shown in FIG. 1 are a plurality of tools which can be operated independently of each other by means of suitable drive members. The machine tool comprises a stand 1, from the base 2 of which extend two parallel walls (FIG. 2b) which define a space 5 which is delimited at the top by an intermediate batten 6.

The machine tool illustrated in FIG. 1 performs, in combination, four different work functions, namely, that of a punch press A, that of a profiled bar cutter B at the middle, and those of a work station C having a bar cutter 7 and a notching tool 8 connected to the cutter, the station C being to the right and on the outside. Associated with each of these three stations or machines is a cylindrical assembly unit 9, 10, and 11, respectively, which has a push-fit in bores 12, 13, and 14, respectively, formed in the two walls 3 and 4 of the machine stand. The assembly units, which are cylindrical throughout, contain, in the form of bores extending radially of their central longitudinal axes, working cylinders 15, 16, and 17. In the case of the assembly units 9 and 10, the end-faces of the working cylinders, which could also be regarded as the cylinder cover plates, are disposed approximately in the diametral plane of the assembly units. i.e., in a statically favorable zone for absorbing high hydraulic pressures. Each of the working cylinders 15, 16, and 17 contains a working piston 18, 19, and 20, respectively, which is mounted to reciprocate in its cylinder and is sealed with respect thereto. Each of these pistons is coupled, in the manner described below, with a tool slide 21, 22, and 23, respectively, which moves in a guide 24, 25, and 26, respectively; the slide 21 carries a punch-holder 27 and a punch 28 which is disposed opposite a die 29 mounted on a support saddle 30 integral with the machine. On the other hand, a profiled bar cutter 31 is mounted on the tool slide 22, and a bar cutter 32 on the tool slide 23; an upper notching blade 33 is also arranged on the outside of the slide, and a lower notching blade 34 is fitted on the machine frame. Furthermore, the tool slide 23 is provided at its lower end with a flat-bar cutter 35 which cooperates with a lower flat-bar cutter 36 secured to the machine stand. The workpieces shown in the stations B and C are angle iron 37, round bar 38, L-section 39, and flat bar 40.

Referring to FIG. 1, the piston 18 of the cylindrical assembly unit for the punch press A has a connecting bolt 41 extending through it, and that end of this bolt that projects at the lower face of the piston 18 and is provided with a screw thread is screwed into a screw-threaded bore 42 in the tool slide 21. At that portion remote from the tool slide 21, the connecting bolt 41 is surrounded by a connecting tube 43 which is outwardly displaceable, coaxially with the working cylinder 15, through a corresponding bore 44 in the cylindrical assembly unit 9. A piston 45 is clamped against this connecting tube 43 by means of a nut 46 which can be screwed onto the screw-threaded outer end of the connecting bolt 41. The piston 45 is guided in a rapidstroke cylinder 47 which is screwed to the inner faces of the oppositely disposed walls 3 and 4 of the machine stand in the customary manner which is therefore not illustrated. A pressurized medium can be supplied through openings 48 and 49 to the piston end and cover-plate-end, respectively, of the cylinder. Pressurized medium is supplied to the working cylinder 15 on the piston rod side only, by way of a duct 50 in the assembly unit, after the rapid forward stroke has been carried out by means of the piston 45.

Instead of the cylindrical assembly unit 9, provided for the punch press A, as shown in FIG. 1, use could be advantageously made of the form of cylindrical assembly unit illustrated in FIGS. 2a and 2b. The construction of this assembly unit corresponds substantially to that of the cylindrical assembly units 10 and 11 for the profiled bar cutter B and the combined round-bar and flat-bar cutter C, so that to provide a clear illustration in FIG. 1, the reference symbols additionally used in FIGS. 2a and 2b, also apply to the corresponding parts in the cylindrical assembly units 10 and 11 of FIG. 1. It can be seen that each of the cylindrical assembly units 10 and 11, coaxial with a working cylinder 16 and 17, respectively, has a relatively short bore 51, which, towards that end remote from the working cylinder, widens out into a cylindrical bore which forms a cylinder 52 having a rapid forward and return stroke. A piston 53 is displaceably mounted in a fluid-tight manner within this cylinder and is clamped against the working cylinder 19 and 20, respectively, by means of a connecting bolt 54 and a connecting tube 55 which acts as a distance piece between the two pistons; the screw-threaded end of each connecting bolt that projects from the piston is screwed to the work slide 22 by means of a nut 56. The cylinder 52 is closed off by a cover plate 57, the outer face of which is aligned with the cylindrical surface of each assembly unit 10 and 11 and has a screw-threaded opening 58 for fitting a flexible pipe carrying pressurized medium. A further pipe carrying pressurized medium is connected by way of a duct 59 to the piston-rod end of the cylinder 52. The cover-plate end of each of the working cylinders 16 and 17 is, as in the case of the assembly unit 9, connected to a duct 50 for supplying pressurized medium for providing the force for carrying out the work stroke. It will be seen from the foregoing description that, because of the ability of the assembly unit to rotate freely in the bores 13 and 14, the assembly unit can turn if, as a consequence of slight lateral clearance between the tool slide 22 and its guides 25, slight torque is applied to the cylindrical assembly unit. Generally, it will not be necessary to secure the cylindrical assembly unit against axial movement, since it is held in its axial position by being firmly clamped to the tool slide.

In the arrangement shown in FIG. 3, a cylinder 60 having a rapid forward and return stroke and in the form of a cylindrical sleeve is inserted in a cylindrical blind-end bore 61 in a cylindrical assembly unit 62; as in the previously described examples, the cylindrical blind-end bore is coaxial with a working cylinder 63 and at right angles to the central longitudinal axis of the cylindrical assembly unit. To enable the complete assembly unit, i.e., the unit provided with the rapid-stroke cylinder 60, to be pushed into the machine stand, the latter, in addition to being provided with the cylindrical bore for the substantially cylindrical assembly unit, also has, at a suitable place, an additional opening 64 so that the assembly unit with the rapid-stroke cylinder 60 only has to be turned through 90° into the working position in the case of the example shown in FIG. 3. The lower screw-threaded end 65 of a connecting bolt 66 can then be screwed to a tool slide 67, and the piston 68 in the rapid-stroke cylinder 60 can be secured to the upper screw-threaded end of the connecting bolt 66 by screwing on a nut 69 and with the aid of the connecting tube 70. Thereafter, the rapid-stroke cylinder 60 is closed off by means of a cover plate 71 which again has an opening 72 for a flexible pipe, not illustrated, for supplying pressurized medium.

As already mentioned, the cylindrical assembly unit 11 corresponds substantially to the assembly unit 10 or to the assembly unit illustrated in FIGS. 2a and 2b. As shown in FIG. 1, the only difference consists in the fact that the end of the connecting bolt that projects through the working piston 20 is screwed to a link-pin 80 which is in turn hinged to a rocking lever 81 which is mounted to rock about a pivot 82 disposed approximately in the main plane of the machine stand. The longer arm of the rocking lever 81 is hinged by way of a connecting lever 83 to the tool slide 23 of the work station C of the machine tool. This arrangement enables the cylindrical assembly units to be distributed in the machine stand in a space-saving manner and, where required, it permits the power transmission ratio to be increased or reduced in dependence upon the length of the arms of the rocking lever 81 in relation to the working stroke of the tool slide 23. It will be seen that the cylindrical assembly unit 11, having a push-fit in the bores 14 formed in the machine stand, executes a swinging rotary movement while the working piston 20 is operating. It will be readily understood that, if required, the same working cylinder to tool slide power transmission ratio can be selected for station C as for the stations B and A, and vice versa. The individual work stations can, of course, also be designed as independent machine tools. In all of the cases that have been described, the invention offers the considerable advantage that the cylindrical assembly units and the bores provided for accommodating them require extremely little expenditure of work, and the assembly units are simply pushed into their working positions in the bores with which they have a push-fit; the push-fit enables the assembly units to execute a swinging rotary movement so as to offset displacement forces which may emanate from the tool slide that has to be moved, at the same time the reaction forces that occur during the working stroke are transmitted into the machine stand over a large area. Also, the highest pressures in the working cylinder occur in the zone of the central longitudinal plane of the cylindrical assembly unit, i.e., in the zone of greatest strength of the unit, without harmful deforming forces becoming effective.

The foregoing description makes it clear that the invention can be used on a wide scale in the case of machine tools, presses, stamping machines, marking machines, deep-drawing machines, and other installations.

What is claimed is:

1. A machine tool including a stand having tool slide mechanisms longitudinally displaceable relative thereto towards respective workpiece holders, said stand defining a plurality of bores extending therethrough transverse to the working direction of the tool slide mechanisms, and a substantially cylindrical assembly unit fitted with a push-fit in at least one of said bores, each said assembly unit including a working cylinder containing a working piston and a piston rod to be actuated by a pressure medium for positioning said piston rod mounted in the stand for moving its respective tool slide mechanism, whereby high shear forces relative to said stand can be sustained and torquing forces can be handled without difficulty.

2. A machine tool in accordance with claim 1 in which the machine stand is composed of oppositely disposed spaced members and the bores extend therethrough and the cylindrical assembly units are disposed therein.

3. A machine tool in accordance with claim 1 in which each working cylinder is formed by a cylindrical blind-end bore in a cylindrical assembly unit, which blind-end bore extends radially of the main axis of the assembly unit.

4. A machine tool in accordance with claim 1 in which the end-face of each working cylinder that is remote from the working piston lies substantially in a diametral plane of the cylindrical assembly unit.

5. A machine tool in accordance with claim 1 which includes a housing a rapid-stroke cylinder disposed in said housing, piston and a piston rod assemblage disposed coaxially with the working cylinder at least a portion of which assemblage is accommodated in each cylindrical assembly unit, means mechanically connecting the piston in the rapid-stroke cylinder with the working piston of each working cylinder, said working piston being of greater diameter than the piston of the rapid-stroke cylinder.

6. A machine tool in accordance with claim 5 in which each rapid-stroke cylinder includes a cylindrical blind-end bore formed in a cylindrical assembly unit.

7. A machine tool in accordance with claim 5 in that the cylindrical assembly unit for the rapid-stroke cylinder in which the rapid-stroke piston is guided is inserted in a blind-end bore formed in the cylindrical assembly unit.

8. A machine tool in accordance with claim 5 in which the rapid-stroke cylinder is disposed on the machine stand at a distance from its respective cylindrical assembly unit.

* * * * *